(12) United States Patent
Hoffman et al.

(10) Patent No.: US 10,595,456 B2
(45) Date of Patent: Mar. 24, 2020

(54) MATERIAL SPREADER

(71) Applicant: KUHN NORTH AMERICA, INC., Brodhead, WI (US)

(72) Inventors: Thomas Hoffman, Sun Prairie, WI (US); Todd Gibson, Brodhead, WI (US); Patrick Henry, Monroe, WI (US); Claude McFarlane, Fitchburg, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 124 days.

(21) Appl. No.: 15/809,756

(22) Filed: Nov. 10, 2017

(65) Prior Publication Data
US 2018/0077854 A1 Mar. 22, 2018

Related U.S. Application Data

(62) Division of application No. 14/622,452, filed on Feb. 13, 2015, now Pat. No. 9,832,922.

(60) Provisional application No. 61/947,858, filed on Mar. 4, 2014.

(51) Int. Cl.
*A01C 3/06* (2006.01)
(52) U.S. Cl.
CPC .................... *A01C 3/063* (2013.01)
(58) Field of Classification Search
CPC ........... A01C 3/06; A01C 3/063; A01C 3/066; A01C 15/06; A01C 15/08; A01C 15/124; A01C 15/126; A01C 15/128; A01C 17/006; A01C 17/008; E01C 19/176; E01C 19/2025

USPC ....... 239/662, 665, 666, 675, 676, 679–687, 239/689
See application file for complete search history.

(56) References Cited

U.S. PATENT DOCUMENTS

| 2,952,466 A | 9/1960 | Carlson et al. |
| 3,136,556 A * | 6/1964 | Wilkes ..................... A01C 3/06 172/45 |
| 3,618,824 A | 11/1971 | Seymour |
| 4,106,706 A | 8/1978 | Burrows |

(Continued)

FOREIGN PATENT DOCUMENTS

| GB | 2157141 A | * 10/1985 | ............. A01C 3/063 |
| GB | 2157141 A | 10/1985 | |

*Primary Examiner* — Cody J Lieuwen
(74) *Attorney, Agent, or Firm* — Oblon, McClelland, Maier & Neustadt, L.L.P.

(57) ABSTRACT

A discharge device includes a plurality of material conveying components, an adjustable shear ledge, and an adjustable shroud to convey materials from a container of a material spreader out onto an open area. The adjustable shear ledge includes at least one longitudinal mounting member such that the adjustable shear ledge may be translated towards or away from the plurality of material conveying components to maintain a predetermined gap distance. The adjustable shroud may also be pivotably connected to the adjustable shear ledge such that the adjustable shroud can be pivoted towards or away from the plurality of material conveying components. The adjustable shear ledge and the adjustable shroud may be moved accordingly to maintain a preferred gap distance and to maintain concentricity with a swing of the material conveying components in order to reduce wear on components and promote spread performance of the material spreader.

15 Claims, 9 Drawing Sheets

(56) References Cited

U.S. PATENT DOCUMENTS

| | | | | |
|---|---|---|---|---|
| 4,187,988 | A | * | 2/1980 | Brackbill ............... A01C 3/066 239/662 |
| 4,804,145 | A | * | 2/1989 | Seymour .................. A01C 3/06 239/288 |
| 5,170,948 | A | * | 12/1992 | Glick ..................... A01C 7/008 239/666 |
| 5,626,298 | A | | 5/1997 | Arnoldy |
| 6,024,305 | A | * | 2/2000 | McFarlane ............... A01C 3/06 239/658 |
| 6,138,927 | A | | 10/2000 | Spear |
| 6,260,778 | B1 | | 7/2001 | Wenger |
| 7,980,484 | B1 | * | 7/2011 | Podoll .................. E01C 19/203 222/196 |
| 2011/0147481 | A1 | * | 6/2011 | Warchola ............. E01C 19/203 239/74 |
| 2011/0278381 | A1 | * | 11/2011 | Aral ..................... A01C 15/122 239/676 |
| 2012/0074240 | A1 | | 3/2012 | Gibson et al. |
| 2014/0131468 | A1 | | 5/2014 | Meritt |

\* cited by examiner

US 10,595,456 B2

MATERIAL SPREADER

CROSS-REFERENCE TO RELATED APPLICATIONS

This application is a divisional application of U.S. application Ser. No. 14/622,452 filed Feb. 13, 2015, which is based upon and claims the benefit of priority from U.S. Provisional Patent Application No. 61/947,858, filed on Mar. 4, 2014; the entire contents of which are incorporated herein by reference.

BACKGROUND

Field of the Disclosure

The present disclosure relates to a material spreader for spreading materials from a container onto an open area, such as a field. Normally, materials such as manure or fertilizers are evenly spread over an entire surface of the field using a material spreader.

Description of the Related Art

In related art, material spreaders such as a side discharge spreader, include a discharge device and a shroud to convey materials from a container of the side discharge spreader and out through a discharge opening. The discharge device may include a plurality of material conveying components that are rotatably secured to a drive shaft. During operation, the material conveying components may rotate about a central axis and swing downward into the material, peeling it off, pulverizing it, and slinging it underhand laterally out the discharge opening. As a result, an even and controlled spread pattern of the material may be achieved.

Over time, however, the plurality of material conveying components begin to wear due to use and a gap distance between an end of the material conveying components and the shroud begins to increase. As the gap distance increases, spread performance of the material conveying components decreases. In an attempt to address this issue, the shrouds in related art may include a single pivot to help bring the shroud closer to the material conveying components. However, the single pivot design causes some portions of the shroud to be closer to the material conveying components than other portions of the shroud. In operation, the varying gap distance causes the material conveying components to follow a path that is non-concentric with the shroud. The non-concentric gap distance results in a less than optimal spread performance and accelerates wear on components. Moreover, additional power is required to rotate the material conveying components to compensate for the larger gap distance between the plurality of material conveying components and the shroud.

SUMMARY

According to an embodiment of the present disclosure, a discharge device of a material spreader may be provided with a plurality of material conveying components and a corresponding adjustable shear ledge and adjustable shroud. The adjustable shroud may be pivotably mounted to the adjustable shear ledge and the adjustable shear ledge may in turn be attached to the material spreader so as to be movable along a first axis and a second axis to bring both the adjustable shear ledge and the adjustable shroud closer to the plurality of material conveying components. By providing the adjustable shear ledge, the gap distance between the top surfaces of the adjustable shear ledge and the adjustable shroud can be maintained substantially concentric with the swing of the material conveying components, enabling the discharge device to maintain a consistent spread pattern. Additionally, by maintaining a substantially concentric gap distance, both power consumption and wear of components is reduced.

According to an embodiment of the present disclosure, a discharge device of a material spreader may be provided with a plurality of material conveying components mounted on a drive shaft that may be adjusted to move relative to a center of a material holding container. A mounting position of the drive shaft may be adjusted by at least one hydraulic system, which may provide a corresponding adjustment of a position of the plurality of conveying components. The at least one hydraulic system may be used with an adjustable shear ledge and/or an adjustable shroud, or may be used with a fixed position shear ledge and/or fixed position shroud. The drive shaft may be adjusted toward or away from the adjustable shear ledge and/or the adjustable shroud, or the fixed position shear ledge and/or the fixed position shroud.

BRIEF DESCRIPTION OF THE DRAWINGS

The characteristics and advantages of exemplary embodiments are set out in more detail in the following description, made with reference to the accompanying drawings.

DETAILED DESCRIPTION OF THE PREFERRED EMBODIMENTS

Figure 1A:
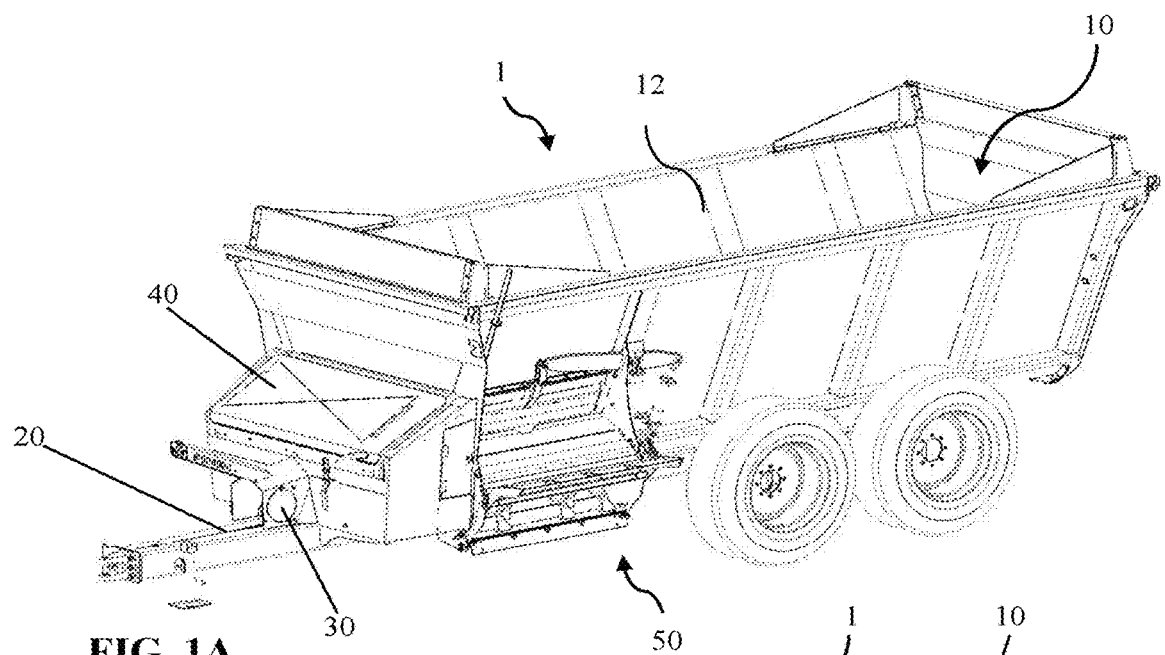
FIG. 1A depicts a top perspective view of an exemplary embodiment of a material spreader according to the present disclosure.

Objects, advantages, and features of the exemplary adjustable shear ledge and shroud for a material spreader described herein will be apparent to one skilled in the art from a consideration of this specification, including the attached drawings.

Referring now to the drawings, wherein like reference numerals designate identical or corresponding parts throughout the several views. It is noted that as used in the specification and the appending claims the singular forms "a," "an," and "the" can include plural references unless the context clearly dictates otherwise.

Figure 1B:
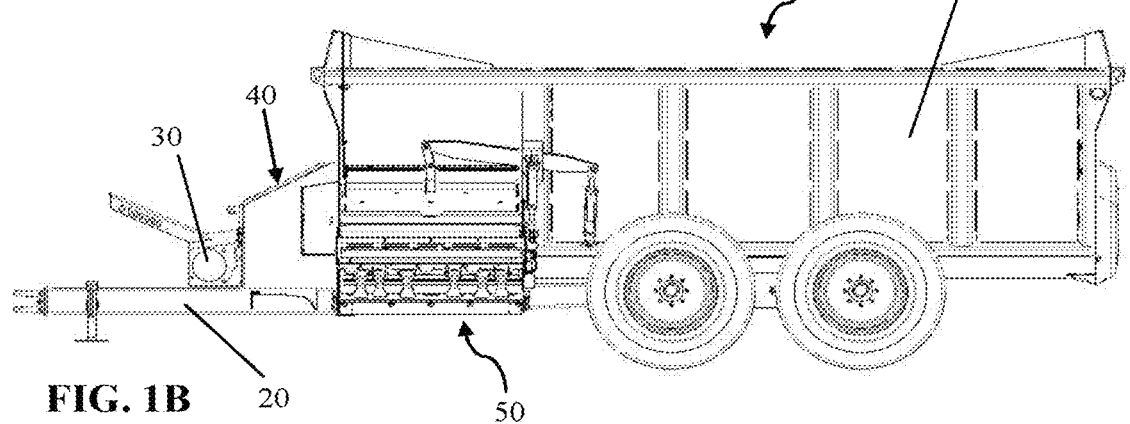
FIG. 1B depicts a side view of the exemplary embodiment of the material spreader of FIG.
Figure 1C:
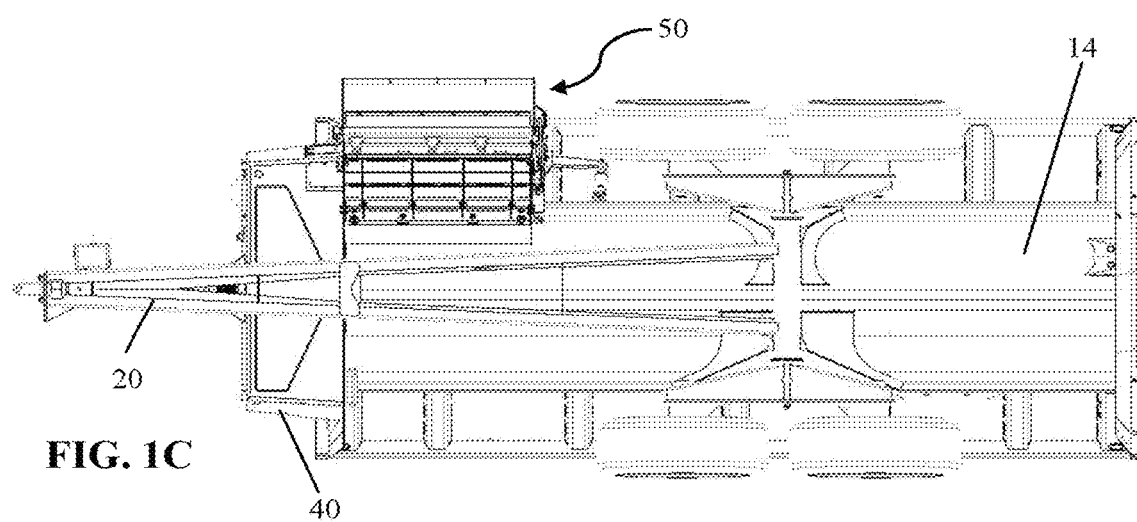
FIG. 1C depicts a bottom view of the exemplary embodiment of the material spreader of FIG. 1A.

As shown in FIGS. 1A-1C, a material spreader 1 of the present disclosure may include a material holding container 10, a hitch 20, a power take-off 30, a drive enclosure 40, at least one auger (not shown), and a discharge device 50. The container 10 of the material spreader 1 may include angled sidewalls 12 to allow materials stored in the container 10, such as manure or fertilizer, to be conveyed downwards toward a bottom 14 of the container 10. The discharge device 50 may be disposed on a side surface of one of the angled sidewalls 12. Additionally, the at least one auger may be housed near the bottom 14 of the container 10, along a portion of one of the angled sidewalls 12.

Figure 2A:
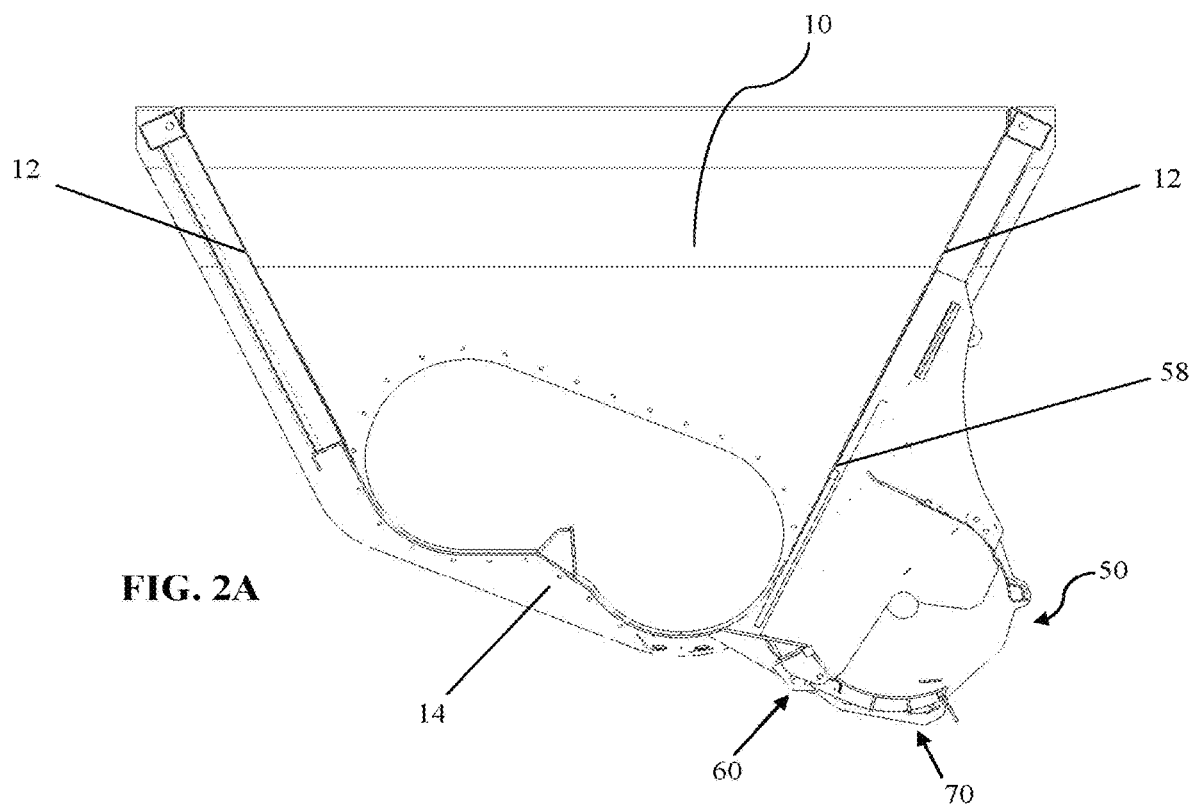
FIG. 2A depicts a front elevation view of an exemplary embodiment of a discharge device with an adjustable shear ledge and an adjustable shroud.
Figure 2B:
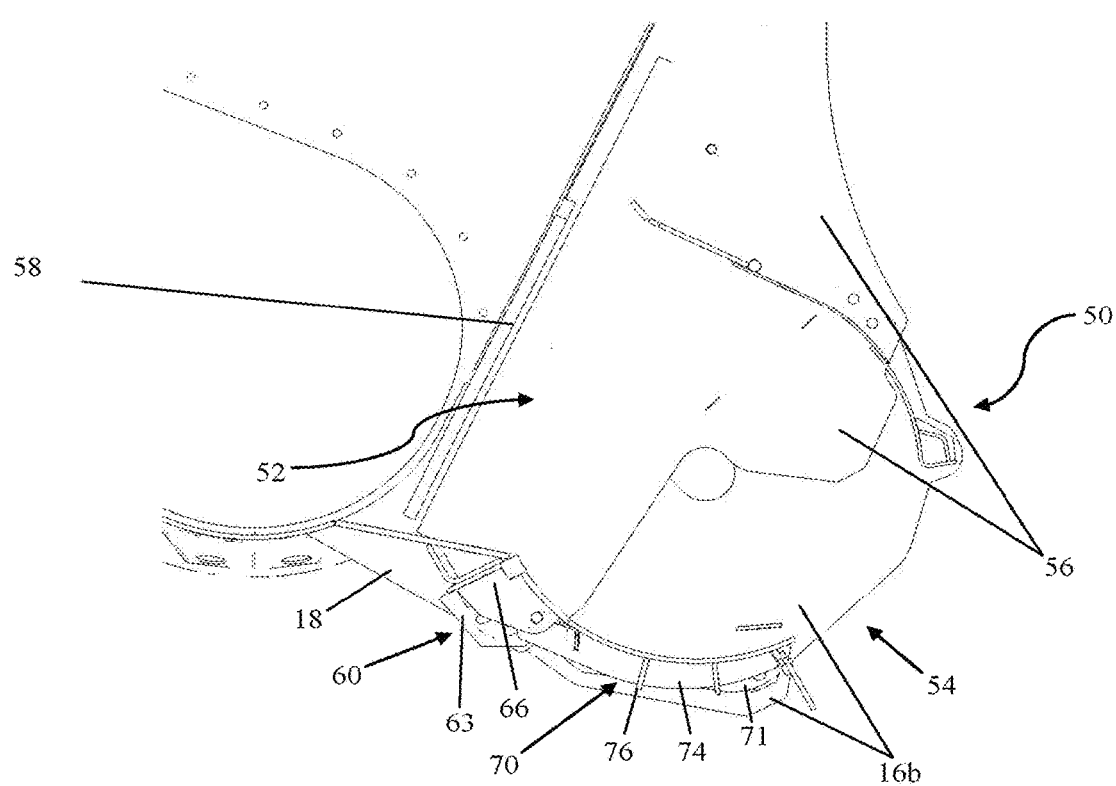
FIG. 2B depicts a close up view of the exemplary embodiment of the discharge device of FIG. 2A.

Referring to FIGS. 2A and 2B, the discharge device 50 may include a discharge inlet 52, a discharge outlet 54, and a housing 56. The discharge inlet 52 may include a discharge door 58 located between the discharge device 50 and the container 10. The discharge door 58 may control the amount of material entering the discharge device 50 from the container 10 or may prevent any material from entering the discharge device 50.

Using rotational power received from the power take-off device 30, the drive enclosure 40 may then convert the power received from the power take-off 30 to an appropriate rotational speed in order to drive the at least one auger. During operation, the at least one auger may be rotatably actuated in order to convey materials located within the container 10 towards the discharge inlet 52. The discharge device 50 may then convey the materials out of the housing 56 via the discharge outlet 54 laterally outward from the discharge device 50, as will be described in further detail below. As shown in FIGS. 2A and 2B, the discharge device 50 may include an adjustable shear ledge 60 and an adjustable shroud 70.

Figure 3A:
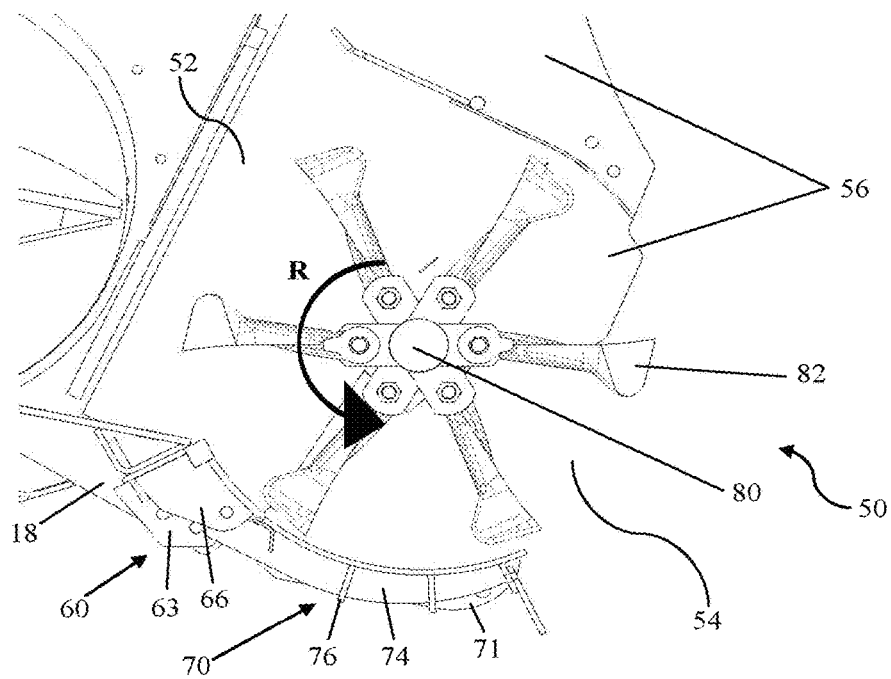
FIG. 3A depicts a front elevation view of an exemplary embodiment of a discharge device with an adjustable shear ledge, an adjustable shroud, and a pivot bracket.
Figure 3B:
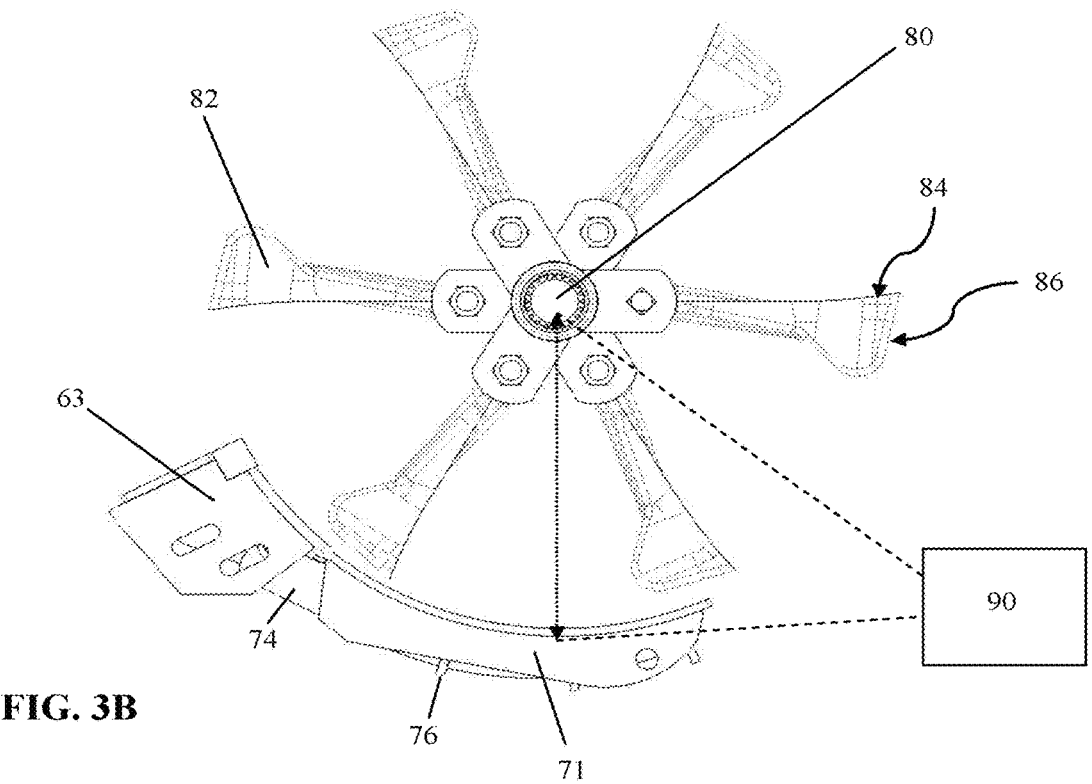
FIG. 3B depicts another front elevation view of the exemplary embodiment of the discharge device of FIG. 3A without the pivot bracket.

As shown in FIGS. 3A and 3B, the discharge device 50 may include a drive shaft 80 and a plurality of material conveying components 82 which may be attached to the drive shaft 80. The drive shaft 80 may be mounted to the housing 56 of the discharge device 50, and the housing 56 may be attached to a side surface of one of the angled sidewalls 12. Each of the plurality of material conveying components 82 may include a front face 84 and a bottom surface 86. The drive enclosure 40 may convert power received from the power take-off 30 to an appropriate rotational speed in order to drive the drive shaft 80. During operation, the drive shaft 80 may be rotatably actuated and the plurality of material conveying components 82 are correspondingly rotated about a center of the drive shaft 80 in a counter-clockwise manner (R), as shown in FIG. 3A. In one embodiment, the center of the drive shaft 80 may be configured to move towards or away from the adjustable shear ledge 60 and/or the adjustable shroud 70 in order to adjust a gap distance between the plurality of material conveying components 82 and at least one of the adjustable shear ledge 60 and the adjustable shroud 70.

Figure 4:
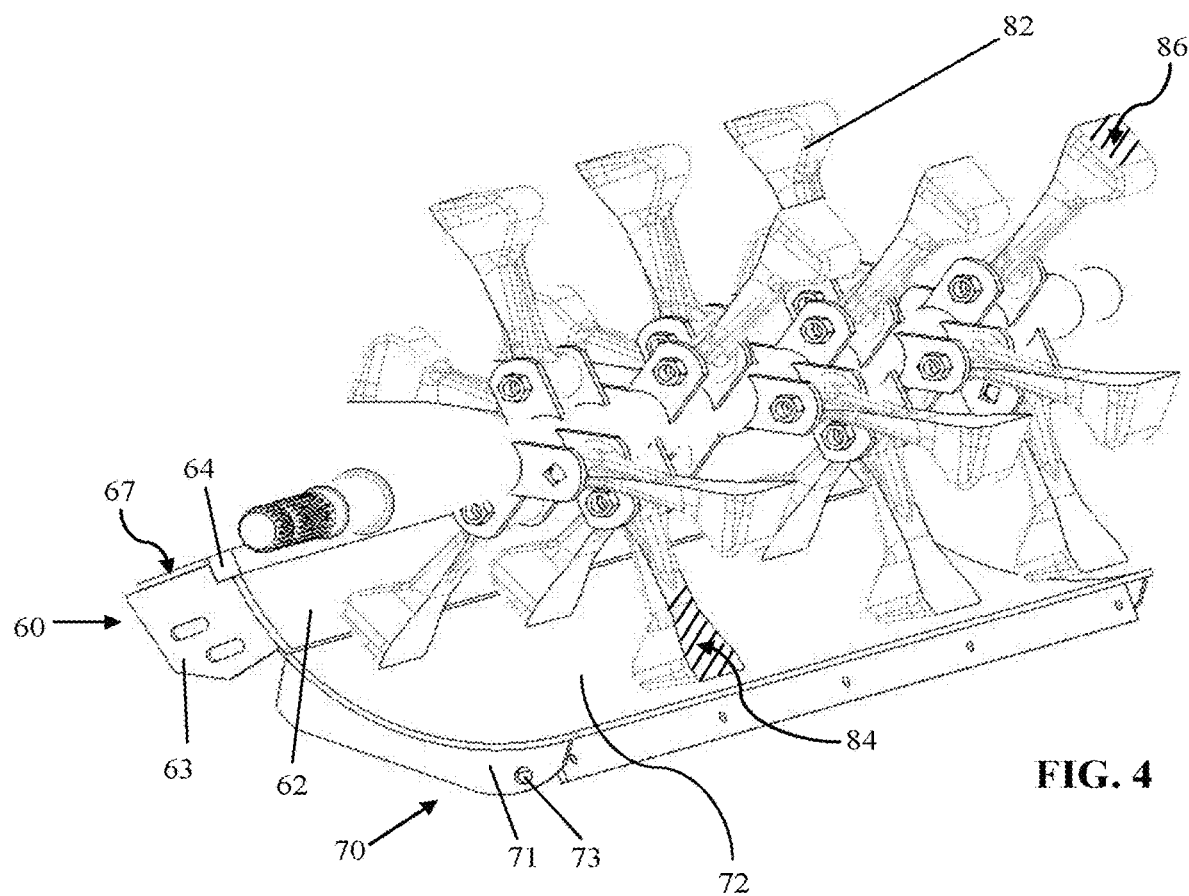
FIG. 4 depicts a perspective view of an exemplary embodiment of a discharge device with material conveying components passing over a top surface of an adjustable shear ledge and a top surface of an adjustable shroud.

In one embodiment, as shown in FIG. 4, the adjustable shear ledge 60 of the discharge device 50 may include a shear top surface 62. The adjustable shear ledge 60 may also include a shearing edge 64. The adjustable shroud 70 of the discharge device 50 may be disposed adjacent to the adjustable shear ledge 60. The adjustable shroud 70 may include a shroud top surface 72.

When the plurality of material conveying components 82 are rotated, a portion of the materials located near the discharge inlet 52 may be scooped up by the front surface 84 of one of the plurality of material conveying components 82. Subsequently, as the front surfaces 84 of the plurality of material conveying components 82 nears the adjustable shear ledge 60, a portion of materials is separated and peeled from the remainder of the materials as other portions of the materials contact the shearing edge 64 located near the discharge inlet 52. The portion of the materials may then be guided along the shear top surface 62. After passing along the shear top surface 62 of the adjustable shear ledge 60, the portion of the materials may then be guided along a shroud top surface 72 and then slung underhand laterally out the side of the discharge outlet 54.

Figure 5:
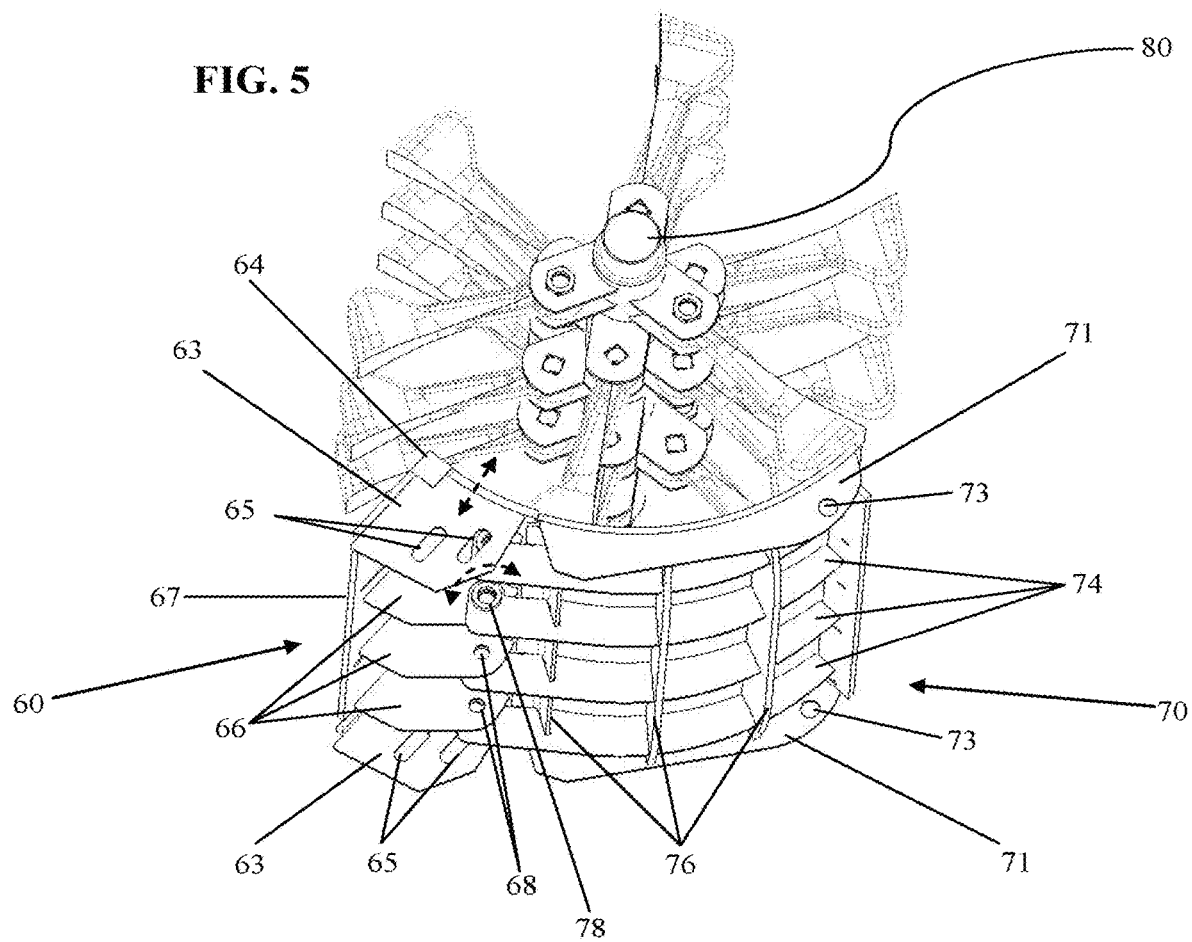
FIG. 5 depicts a perspective view of an exemplary embodiment of a discharge device.

In one embodiment, as shown in FIG. 5, the adjustable shear ledge 60 may include a plurality of reinforcing tabs 66. The plurality of reinforcing tabs 66 may be disposed on an underside of the adjustable shear ledge 60, opposite of the shear top surface 62, in order to provide structural strength to the adjustable shear ledge 60. Each of the plurality of reinforcing tabs 66 may also include a mounting hole 68 disposed on an end opposite of the shearing edge 64. The adjustable shear ledge 60 may also include a plurality of mounting brackets 63 having mounting members 65 disposed thereon. The mounting members 65 may be in the form of a longitudinal slot or a longitudinal rail. The plurality of mounting brackets 63 may be provided on opposite lateral ends of the adjustable shear ledge 60. The mounting members 65 of the mounting brackets 63 may be parallel with a rear surface 67 of the shearing edge 64. In one embodiment, each of the plurality of mounting brackets 63 includes at least two mounting members 65. In one embodiment, the shearing edge 64 moves along a plane that passes substantially through a center of the shaft 80.

The adjustable shroud 70 may include a plurality of longitudinal ribs 74 and a plurality of lateral ribs 76 on a side opposite of the shroud top surface 72 in order to provide structural rigidity to the adjustable shroud 70. One end of the longitudinal ribs 74 may include a through hole 78. The adjustable shroud 70 may include a plurality of external mounting plates 71 disposed on each lateral end of the adjustable shroud 70. A shroud mounting hole 73 may also be provided on each of the external mounting plates 71.

In one embodiment, the adjustable shear ledge 60 and adjustable shroud 70 may be assembled adjacent to each other. The adjustable shear ledge 60 may be pivotably connected to the adjustable shroud 70. A fastener or bearing (not shown) may be provided to couple the mounting hole 68 of the adjustable shear ledge 60 to the through hole 78 of the adjustable shroud 70. In operation, the adjustable shroud 70 may pivot relative to the adjustable shear ledge 60. In one embodiment, the fastener or bearing securing the adjustable shear ledge 60 to the adjustable shroud 70 may be designed to fail, when a predetermined load is applied to the adjustable shear ledge 60 and/or the adjustable shroud 70, in order to provide overload protection for the other components of the discharge device 50. For example, overload protection may be required when an unusually large object attempts to pass through the discharge device 50 and would otherwise become stuck or cause damage to critical, expensive, or hard to replace components of the discharge device.

Figure 6:
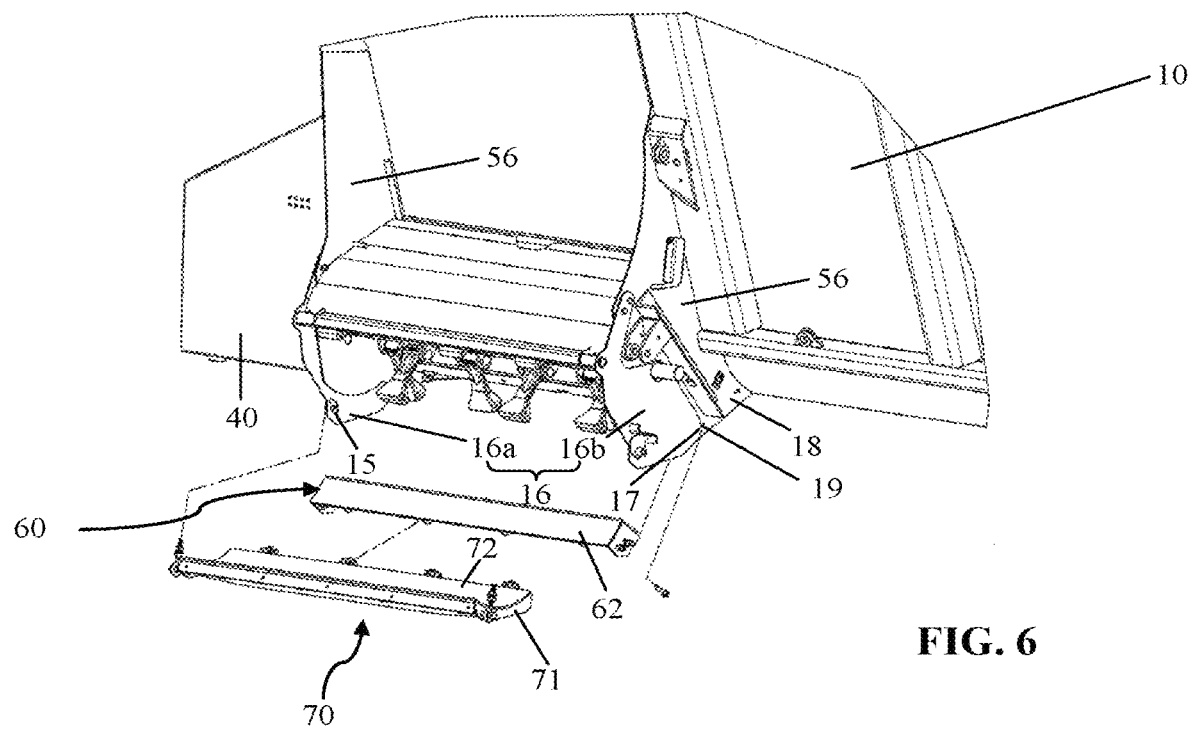
FIG. 6 depicts a side exploded view of an exemplary embodiment of a discharge device.
Figure 7:
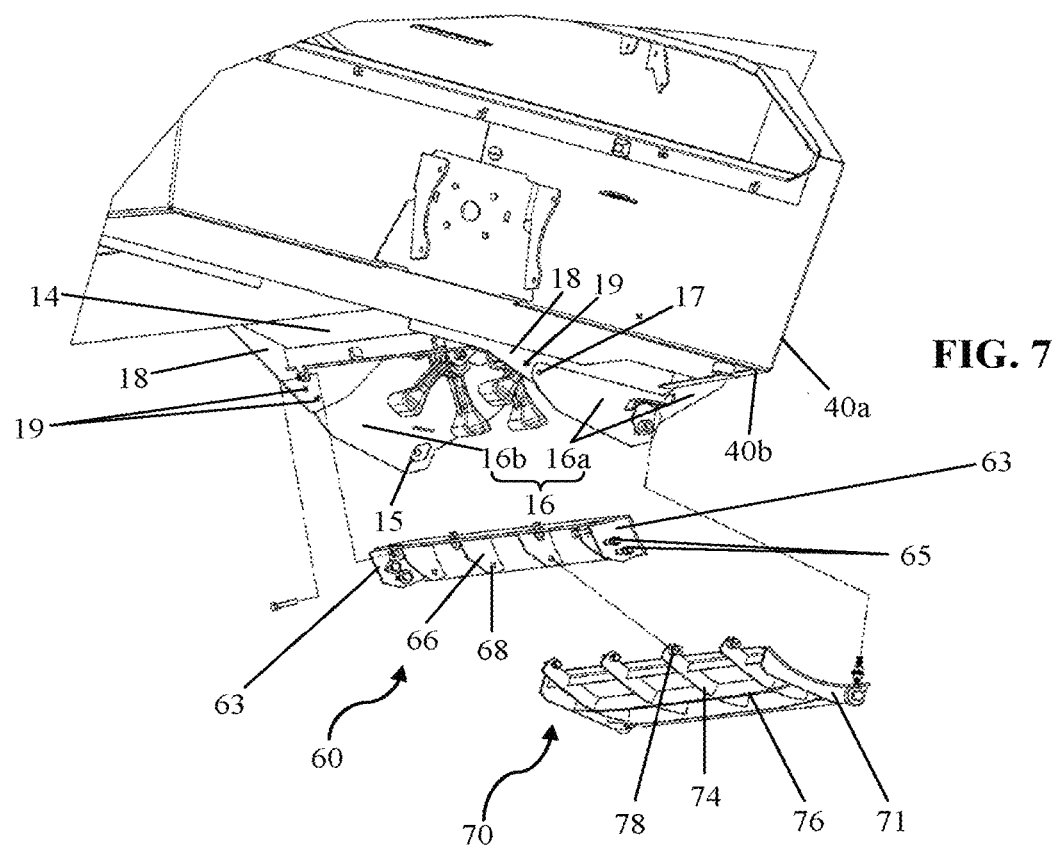
FIG. 7 depicts a bottom exploded view of an exemplary embodiment of a discharge device.
Figure 8:
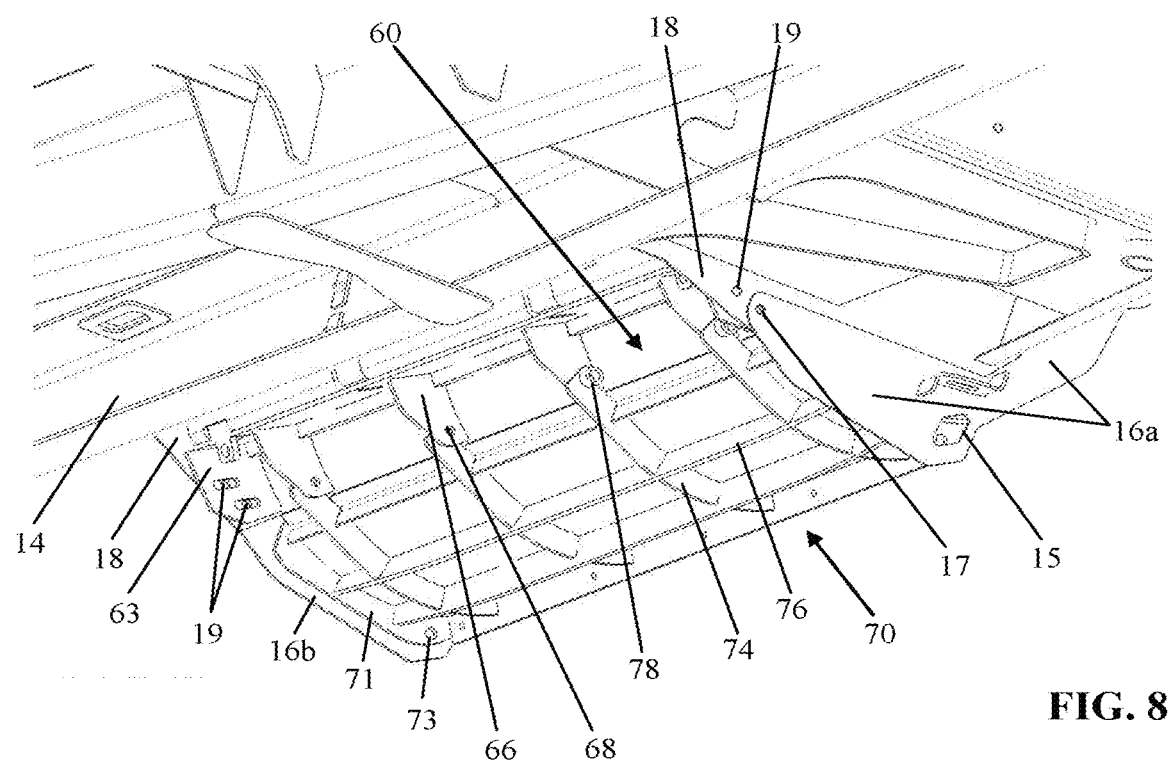
FIG. 8 depicts another bottom perspective view of an exemplary embodiment of a discharge device.

As shown in FIGS. 6-8, the adjustable shear ledge 60 and the adjustable shroud 70 may be mounted to the bottom 14 of the container 10. The adjustable shear ledge 60 may be a self-contained structure, or the adjustable shear ledge 60 may be integral with the container 10. In one embodiment, outer mounting beams 16 may be positioned on opposite sides of the shaft 80 as shown in FIGS. 6 and 7. The outer mounting beams 16 may be attached to inner mounting beams 18 positioned below the bottom 14 of the container 10. A first outer mounting beam 16a may be disposed closer towards a front end of the material spreader 1. As shown in FIGS. 6 and 7, the first outer mounting beam 16a may be formed to correspond to a portion of the drive enclosure 40 so as to fit around a side 40a and a bottom portion 40b of the drive enclosure 40. A second outer mounting beam 16b may be disposed closer towards a rear end of the material spreader 1. The outer mounting beams 16 may each include a shroud adjusting port 15. The outer mounting beams 16 may each include at least one first shear adjustment port 17, or at least one shear adjusting track (not shown). Each first shear adjustment port 17 may be attached by a bolt or other fastener to at least one of a plurality of second adjustment ports 19, or one of a plurality of second shear adjusting tracks (not shown), formed in the inner mounting beams 18. In one embodiment, the mounting members 65 may be provided on the mounting beams 16, 18, and corresponding adjustment ports, or adjustment tracks, may be provided on the mounting brackets 63.

Figure 9A:
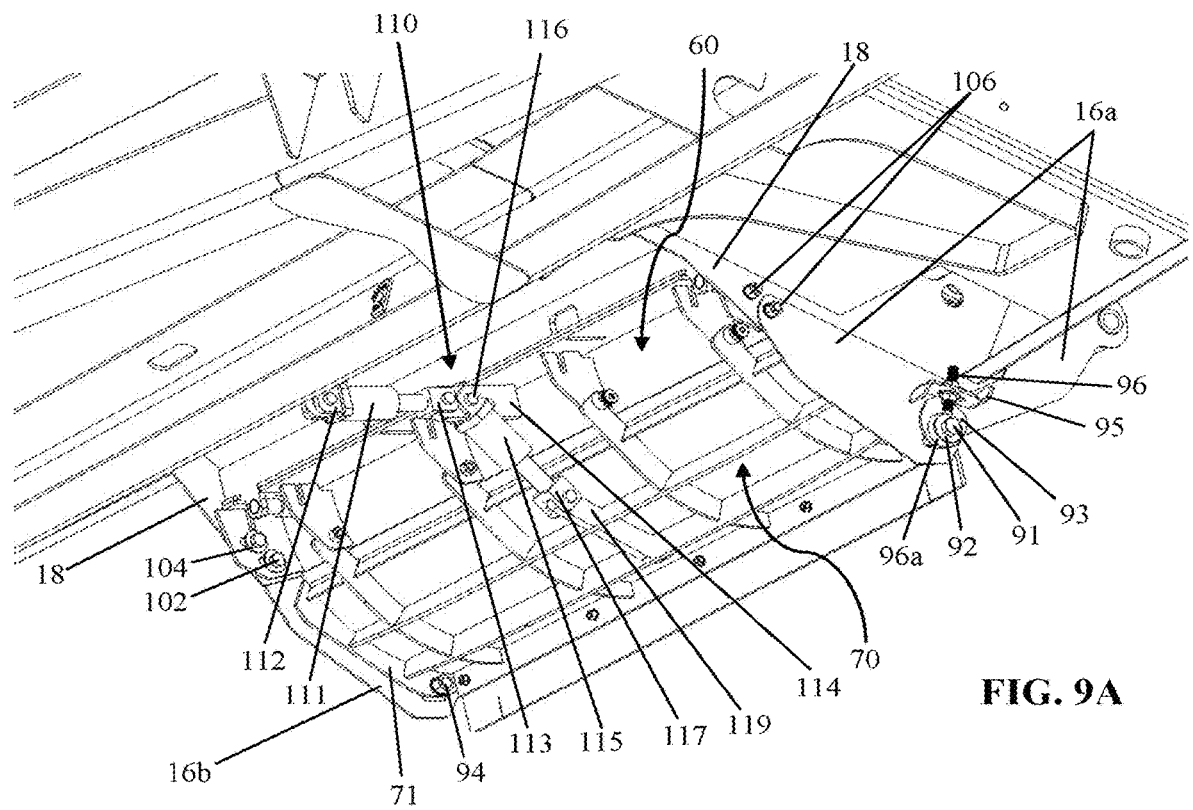
FIG. 9A depicts a perspective view of an exemplary hydraulic system for adjusting a position of an adjustable shear ledge and an adjustable shroud.

In one embodiment, as shown in FIGS. 7 and 8, each of the mounting brackets 63 of the adjustable shear ledge 60 may be attached to a respective inner mounting beam 18, and a respective one of the first outer mounting beam 16a and the second outer mounting beam 16b. By lining up the mounting members 65 with the first shear adjustment ports 17 and the second shear adjustment ports 19, a bolt and/or another fastener system may be used to secure the adjustable shear ledge 60 to the mounting beams (16, 18). In one embodiment, as shown in FIG. 9A, the fastener system may include, on one side, at least one bolt 102 and at least one washer 104 secured to least one nut 106 on an opposite side of the a respective mounting beam (16a, 16b, or 18) to lock the adjustable shear ledge 60 in a desired position.

In one embodiment, the at least one bolt 102 may be designed to fail, when a predetermined load is applied to the adjustable shear ledge 60 and/or the adjustable shroud 70, to provide overload protection for the other components of the discharge device 50. In one embodiment, the at least one bolt 102, the at least one washer 104, and the at least one nut 106 may be forcibly slid along the slots or rails provided by the mounting members 65, while being secured to one of the first shear adjustment ports 17 and/or one of the second shear adjustment ports 19, when a predetermined load is applied to the adjustable shear ledge 60 and/or the adjustable shroud 70, to provide overload protection for the other components of the discharge device 50.

In one embodiment, the adjustable shear ledge 60 may be provided with a guide system, and the mounting beams (16, 18) may be provided with a corresponding follower system to follow the guide system. In one embodiment, the adjustable shear ledge 60 may be provided with a follower system and the mounting beams (16, 18) may be provided with a guide system. The guide system and the follower system may enable the adjustable shear ledge 60 to be repositioned relative to the plurality of material conveying components 82 by way of repositioning the adjustable shear ledge 60 on the mounting beams (16a, 18).

In one embodiment, the guide system may be in the form of a track, groove, rail, etc., and the corresponding follower system may be in the form of a peg, wheel, ball joint, etc. For example, the peg of the follower system may follow along a track of the guide system. In one embodiment, fasteners may be used to set and hold a current location of the follower system relative to the guide system. In one embodiment, a set screw or a bolt and nut combination may be used to secure and lock the follower system at a particular location on the guide system to lock a position of the adjustable shear ledge 60 in place.

In one embodiment a shock absorption system may be disposed between the adjustable shear ledge 60 and the mounting beams (16, 18) in order to provide overload protection for the adjustable shear ledge 60. In one embodiment, a shock absorption system may be interposed between the guide system and the follower system. The shock absorption system may include a spring-loaded mount or an elastomeric mount. In one embodiment, the shock absorption system may enable the adjustable shear ledge 60 to move relative to the mounting beams (16, 18) and away from the plurality of material conveying components 82.

In one embodiment, the shock absorption system may provide overload protection by enabling large objects or obstructions to pass through the discharge device 50 by temporarily increasing an operating clearance between the plurality of material conveying components 82 and the adjustable shear ledge 60, and/or between the plurality of material conveying components 82 and the adjustable shroud 70. Once the large object or obstruction has passed, the shock absorption system may return the adjustable shear ledge 60 and/or the adjustable shroud 70 back to a normal or previously set location and operating clearance. The overload protection may thereby prevent damage to the discharge device and reduces operating down time.

In one embodiment, adjustments to the adjustable shear ledge 60 and/or the adjustable shroud 70 may be performed manually by an operator loosening/tightening bolts and/or fasteners and then shifting a current position of the adjustable shear ledge 60 to a new position. In one embodiment, adjustments to the adjustable shear ledge 60 and/or the adjustable shroud 70 may be implemented using a hydraulic system or a mechanical linkage.

In one embodiment, a shroud mounting port 15 may be formed in each of the outer mounting beams 16 as shown in FIG. 8. With the shroud mounting port 15, respective mounting plates 71 may be attached to each of the outer mounting beams 16. Specifically, by lining up each shroud mounting hole 73 with a portion of a respective shroud adjusting port 15, a bolt and/or other fastener may be used to secure the adjustable shroud 70 to a respective outer mounting beam (16a, 16b).

Figure 9B:
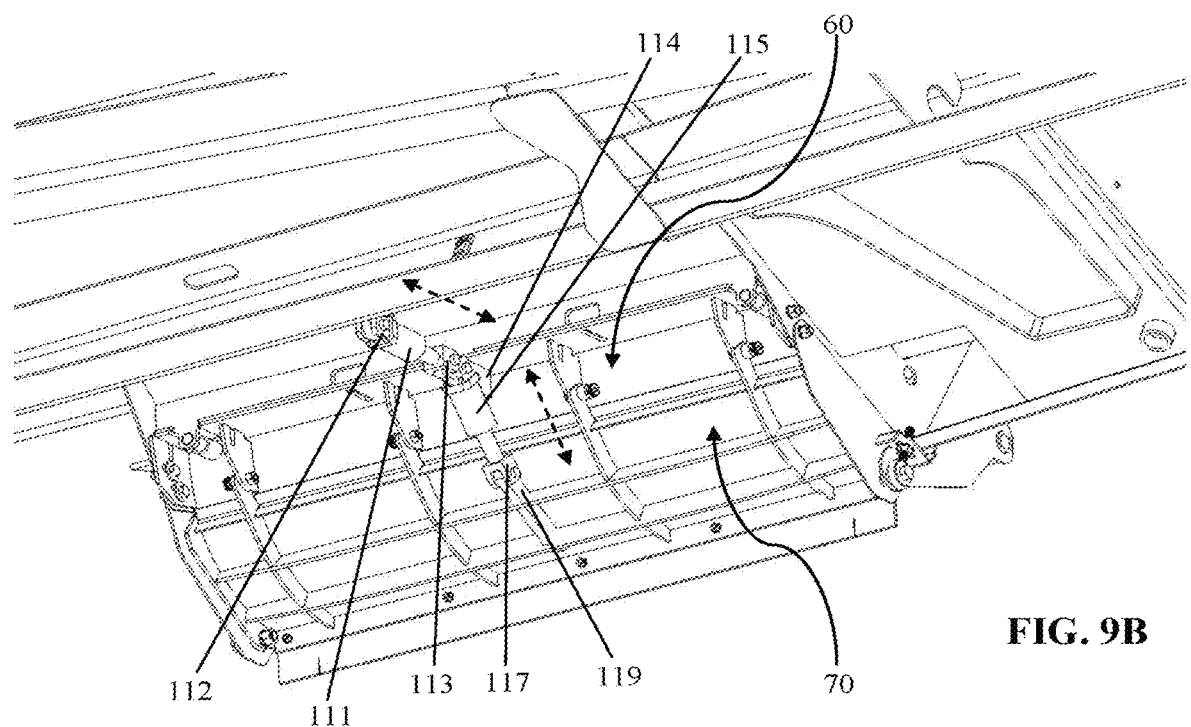
FIG. 9B depicts another perspective view of the exemplary hydraulic system of FIG. 9A.

In one embodiment, as shown in FIGS. 8, 9A, and 9B, an opening of the shroud adjusting port 15 may be sized larger than an opening of the mounting hole 73. In this configuration, the mounting hole 73 can be moved vertically and/or horizontally into an infinite number of positions, with respect to the shroud adjusting port 15, while still remaining within a boundary of the opening of the shroud adjusting port 15. A bolt and/or other fastener together with a washer or a movable installation plate may be used to secure the adjustable shroud 70 to the outer mounting beams 16.

In one embodiment, as shown in FIG. 9A, a bolt 91, a washer 92, an eccentric plate 93, and a nut 94 may be provided to secure the external mounting plates 71 to the outer mounting beams 16. The eccentric plate 93 may be provided to prevent the bolt 91 from passing through the opening of the adjusting port 15 while enabling the bolt 91 to be secured to the nut 94 in a plurality of positions. In one embodiment, a bracket 95 and a set screw adjustment 96 which may include an eyebolt, may be provided to assist in aligning the adjustable shroud 70. By adjusting the location of where the adjustable shroud 70 is secured with respect to the outer mounting beams 16, a gap distance between the shroud top surface 72 and the plurality of material conveying components 82 may be adjusted to achieve a desired gap distance and to promote concentricity.

In one embodiment, the bolt 91 may be designed to fail when a predetermined load is applied to provide overload protection for the other components of the discharge device 50. In one embodiment, the bolt 91, the washer 92, the eccentric plate 93, and the nut 94 may be forcibly repositioned with respect to the opening of the adjusting port 15, while being secured to one of the shroud mounting holes 73, when a predetermined load is applied to provide overload protection for the other components of the discharge device 50.

In one embodiment, the external mounting plates 71 of the adjustable shroud 70 may be provided with a guide system, and the outer mounting beams 16 may be provided with a corresponding follower system to follow the guide system. The guide system may be in the form of a track, groove, rail, etc. In one embodiment, the external mounting plates 71 of the adjustable shroud 70 may be provided with a follower system, and the outer mounting beams 16 may be provided with a corresponding guide system to guide the follower system. The guide system and the follower system may enable the adjustable shroud 70 to be repositioned relative to the plurality of material conveying components 82 by way of repositioning the adjustable shroud 70 on the outer mounting beams 16.

In one embodiment, the guide system may be in the form of a track, groove, rail, etc., and the corresponding follower system may be in the form of a peg, wheel, ball joint, etc. For example, the peg of the follower system may follow along a track of the guide system. In one embodiment, fasteners may be used to set and hold a current location of the follower system relative to the guide system. In one embodiment, fasteners may be used to set and hold a current location of the follower system with respect to the guide system. In one embodiment, a set screw or a bolt and nut combination may be used to secure the follower system at a particular location on the guide system to lock a position of the adjustable shear shroud 70 in place.

In one embodiment a shock absorption system may be disposed between the adjustable shroud 70 and the outer mounting beams 16 in order to provide overload protection for the adjustable shroud 70. In one embodiment, a shock absorption system may be interposed between the guide system and the follower system. The shock absorption system may include a spring-loaded mount or an elastomeric mount. In one embodiment, the shock absorption system may enable the adjustable shroud 70 to move relative to the outer mounting beams and away from the plurality of material conveying components 82.

In one embodiment, the shock absorption system may provide overload protection by enabling large objects or obstructions to pass through the discharge device 50 by temporarily increasing an operating clearance between the plurality of material conveying components 82 and the adjustable shear ledge 60, and/or between the plurality of material conveying components 82 and the adjustable shroud 70. Once the large object or obstruction has passed, the shock absorption system may return the adjustable shear ledge 60 and/or the adjustable shroud 70 back to a normal or previously set location and operating clearance. The overload protection may thereby prevent damage to the discharge device and reduces operating down time.

In one embodiment, both the adjustable shear ledge 60 and the adjustable shroud 70 may both be moved with respect to the mounting beams (16, 18) to achieve a desired gap distance and promote concentricity with the plurality of material conveying components 82. Additionally, while the adjustable shear ledge 60 and adjustable shroud 70 are being moved, the adjustable shroud 70 may also be pivoted with respect to the adjustable shear ledge 60, thus enabling the entire shroud top surface 72 to be brought closer towards the plurality of material conveying components 82 to promote concentricity.

In one embodiment as shown in FIGS. 9A and 9B, a hydraulic system 110 may be provided to adjust a position of the adjustable shear ledge 60 and the adjustable shroud 70. The hydraulic system 110 may include a first hydraulic actuator 111 secured at a first end 112 to the bottom of the container 14 or to the housing 56 of the discharge device 50. The hydraulic actuator 111 may be secured at a second end 113 to a bracket 114 of the adjustable shear ledge 60. In one embodiment, the hydraulic actuator 111 may be installed parallel with or substantially parallel with the bottom of the container 14 to laterally adjust a position of the adjustable shear ledge 60, or both the adjustable shear ledge 60 and the adjustable shroud 70. In one embodiment, the adjustable shear ledge 60 and/or the adjustable shroud 70 may be repositioned laterally away from a center of the container 10 as the hydraulic actuator 111 is extended, or towards the center of the container 10 as the hydraulic actuator 111 is retracted.

The hydraulic system 110 may include a second hydraulic actuator 115 with a first end 116 secured to the bracket 114 of the adjustable shear ledge 60. The second hydraulic actuator 115 may include a second end 117 secured to a bracket 119 of the adjustable shroud 70. In one embodiment, the second hydraulic actuator 115 may extend at an angle, downward from the first hydraulic actuator 111, in order to rotatably adjust the adjustable shroud 70 with respect to the adjustable shear ledge 60. In one embodiment, the adjustable shroud 70 may be rotated upward towards the plurality of material conveying components 82 as the second hydraulic actuator 115 is extended, or rotated downward away from the plurality of material conveying components 82 as the second hydraulic actuator 115 is retracted.

In one embodiment, the first hydraulic actuator 111 and/or the second hydraulic actuator 115 may be adjusted to extend or retract on demand in response to a predetermined load applied to the adjustable shear ledge 60 and/or adjustable shroud 70 to provide overload protection for the other components of the discharge device 50.

In one embodiment, the adjustable shear ledge 60 may be provided with a guide system, and the mounting beams (16, 18) may be provided with a corresponding follower system to follow the guide system, or vice versa. The guide system and the follower system, together with the hydraulic system, may be used to adjust a position of the adjustable shear ledge 60 and/or the adjustable shroud 70 relative to the plurality of material conveying components 82 by way of repositioning the adjustable shear ledge 60 and/or the adjustable shroud 70 on the mounting beams (16, 18). The first hydraulic actuator 111 may be used to set and hold a position of the adjustable shear ledge 60 relative to the mounting beams (16, 18).

The guide system and the follower system, together with the hydraulic system 110, may be used to adjust a position of the adjustable shear ledge 60 and/or the adjustable shroud 70 relative to the plurality of material conveying components 82 by way of repositioning the adjustable shroud 70 and/or the adjustable shear ledge 60 on the mounting beams (16, 18). The second hydraulic actuator 115 may be used to set and hold a position of the adjustable shroud 70 and/or the adjustable shear ledge 60 on the mounting beams (16, 18).

In one embodiment, a shock absorption system may be installed in series or in parallel with the first hydraulic actuator 111 and/or the second hydraulic actuator 115. The shock absorption system may provide overload protection by enabling large objects or obstructions to pass through the discharge device 50 by temporarily increasing an operating clearance between the plurality of material conveying components 82 and the adjustable shear ledge 60, and/or between the plurality of material conveying components 82 and the adjustable shroud 70. Once the large object or obstruction has passed, the shock absorption system may return the adjustable shear ledge 60 and/or the adjustable shroud 70 back to a normal or previously set location and operating clearance. In one embodiment, the shock absorption system may be spring loaded device.

In one embodiment, the shock absorption system is actuated when a predetermined force is applied on the adjustable shear ledge 60 and/or the adjustable shroud 70. In one embodiment, when the shock absorption system is actuated, a distance between the first end 112 and the second end 113 of the first hydraulic actuator 111 may be extended or shortened as needed to allow the obstruction to pass. In one embodiment, when the shock absorption system is actuated, a distance between the first end 116 and the second end 117 of the second hydraulic actuator 115 may be extended or shortened as needed to allow the obstruction to pass.

Figure 10A:
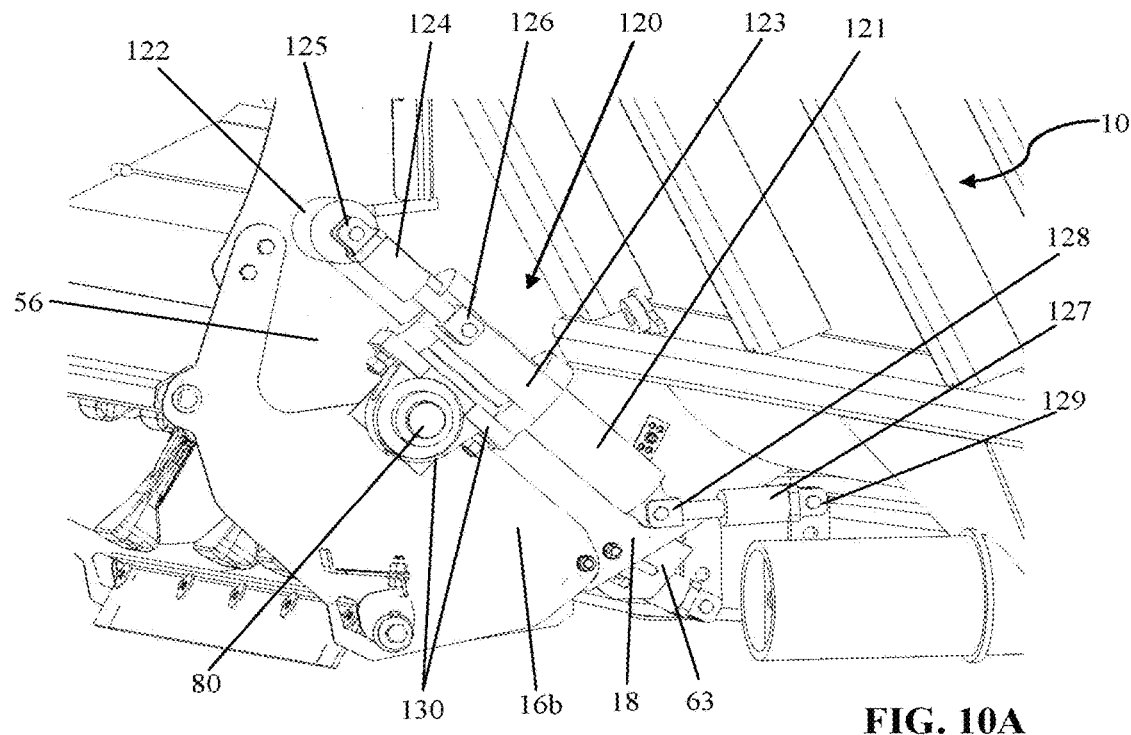
FIG. 10A depicts a perspective view of an exemplary hydraulic system for adjusting a position of a drive shaft supporting a plurality of material conveying components.
Figure 10B:
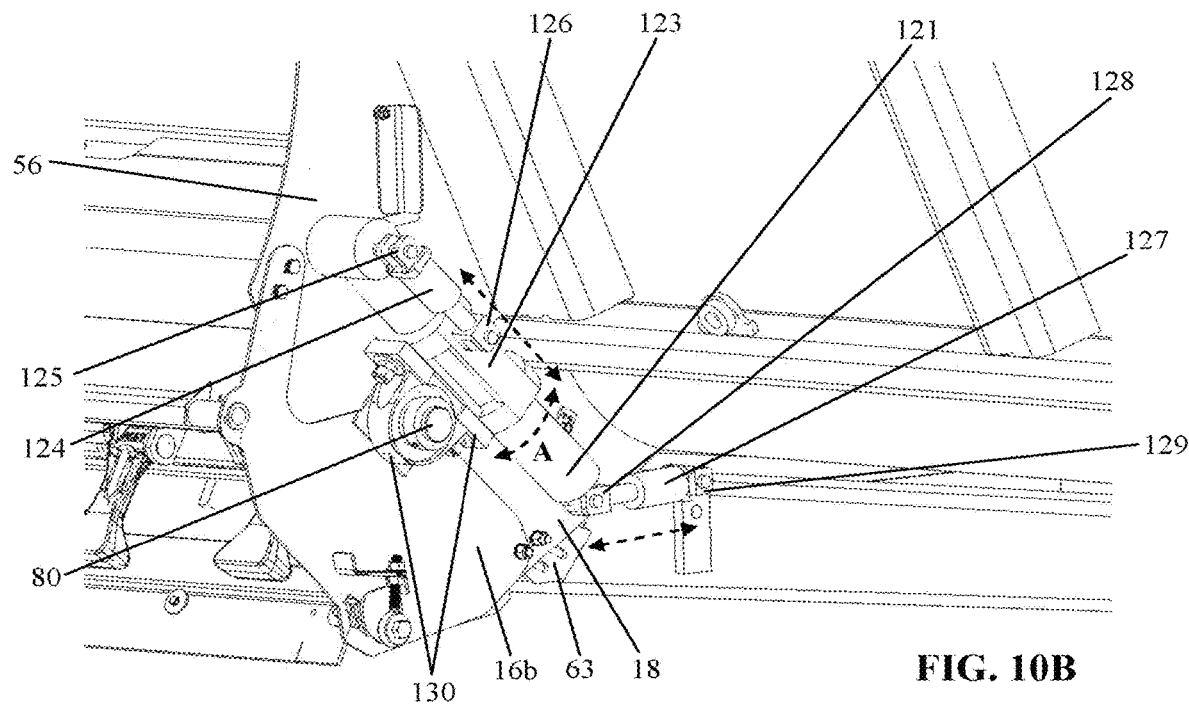
FIG. 10B depicts another perspective view of the exemplary hydraulic system of FIG. 10A.

In one embodiment, as shown in FIGS. 10A and 10B, at least one hydraulic system 120 may be provided to adjust a mounting position of the drive shaft 80 with respect to the housing 56. The at least one hydraulic system 120 may be used with one of the adjustable shear ledge 60 and/or the adjustable shroud 70, or may be used with a fixed position shear ledge and/or fixed position shroud. The drive shaft 80 may support the plurality of material conveying components 82 and the adjustment of the mounting position may correspondingly adjust a position of the plurality of material conveying components 82 with respect to an installed shear ledge and shroud to improve a swing path of the plurality of material conveying components 82. In one embodiment, the hydraulic system 120 may be provided on either side of the housing 56 to support at least both ends of the drive shaft 80. The hydraulic system 120 may include a support column 121 that is rotatable and secured to a pivot 122 which may be attached to the housing 56. The hydraulic system 120 may include a collar mechanism 123 that may be slidably supported on the support column 121.

In one embodiment, a first hydraulic actuator 124 may be provided to adjust an axial position of the collar mechanism 123 along a length of the support column 121. A bearing support member 130 may be attached to the collar mechanism 123 to secure the drive shaft 80 to the housing 56. The first hydraulic actuator 124 may be attached at a first end 125 to the pivot 122 and at a second end 126 to the collar mechanism 123. In one embodiment, the drive shaft 80 may be adjusted towards the adjustable shear ledge 60 and/or the adjustable shroud 70 as the first hydraulic actuator 124 is extended, or adjusted away from the adjustable shear ledge 60 and/or the adjustable shroud 70 as the first hydraulic actuator 124 is retracted.

In one embodiment, the collar mechanism 123 may include a plurality of circular rings sized to receive the support column 121 along their respective inner circumference. A beam member may be provided to connect the plurality of circular rings to one another. The circular rings may include mounts for attaching the bearing support member 130 thereto.

In one embodiment, a second hydraulic actuator 127 may be provided to adjust an angle A of the support column 121 with respect to the pivot 122. The second hydraulic actuator 127 may be attached at a first end 128 to an end of the support column 121, opposite from the pivot 122. The second hydraulic actuator 127 may be attached to a second end 129 that is secured to a side of the housing 56 or the container 10. In one embodiment, the drive shaft 80 may be swung laterally away from a center of the container 10 as the second hydraulic actuator 127 is extended, or swung toward a center of the container 10 as the second hydraulic actuator 127 is retracted.

In one embodiment, the first hydraulic actuator 124 and/or the second hydraulic actuator 127 may be adjusted to extend or retract on demand in response to a predetermined load applied to the adjustable shear ledge 60, adjustable shroud 70, and/or the plurality of material conveying components 82 to provide overload protection for the other components of the discharge device 50.

In one embodiment, a shock absorption system may be installed in series or in parallel with the first hydraulic actuator 124 and/or the second hydraulic actuator 127 to provide overload protection by enabling large objects or obstructions to pass through the discharge device 50 by temporarily adjusting a position of the drive shaft 80. Once the large object or obstruction has passed, the shock absorption system may return the drive shaft 80 back to a normal or previously set position. In one embodiment, the shock absorption system may be a spring loaded device. In one embodiment, the shock absorption system is actuated when a predetermined lateral force is applied to the drive shaft 80.

In one embodiment, adjustments may be made by an operator based on visual inspection of the discharge device 50. As shown in FIG. 3B, a sensor 90 to measure a gap distance and/or to measure torque of the material conveying components 82 may be provided to give a reading of the measurement to the operator, whereby the operator can adjust the gap distance between the adjustable shear ledge 60 and/or the adjustable shroud 70 with the plurality of material conveying components 82 to a desired gap distance.

In one embodiment, the sensor 90 may be provided to measure a gap distance between the plurality of material conveying components 82 and the adjustable shear ledge 60 and/or the adjustable shroud 70 to determine whether the gap distance is in an appropriate operating range, and to automatically adjust the gap distance using the hydraulic system 120. In one embodiment, a sensor measuring a torque of the material conveying components 82 may be provided to detect whether the discharge device 50 is in an appropriate operating range and to automatically adjust the gap distance between the adjustable shear ledge 60 and/or the adjustable shroud 70 with the plurality of material conveying components 82 using the hydraulic system 120.

In one embodiment, each of the mounting members 65 is a longitudinal opening (e.g. slot) that extends towards the shear top surface 62. In this configuration, the adjustable shear ledge 60 may be positioned or repositioned along a vertical axis and a horizontal axis, both the vertical axis and the horizontal axis being perpendicular to an axis of the drive shaft 80. By positioning or repositioning the adjustable shear ledge 60, a gap distance between the shear top surface 62 and the plurality of material conveying components 82 may be adjusted to achieve a desired gap distance and to promote concentricity. In one embodiment, the gap distance may be between 0.05 and 0.25 inches. In another embodiment, the gap distance may be between 0.10 and 0.15 inches.

It is understood that the adjustable shear ledge and shroud of the present disclosure is not limited to the particular embodiments disclosed herein, but embraces much modified forms thereof that are within the scope of the following claims.

The invention claimed is:

1. A method of controlling a discharge device including a plurality of material conveying components, the method comprising:
   determining whether the discharge device is in an appropriate operating range; and
   adjusting the discharge device based on the determining,
   wherein the discharge device includes
      an adjustable shear ledge including an arcuate shear top surface,
      an adjustable shroud, and
      an actuator that moves at least one of the adjustable shear ledge and the adjustable shroud,
   wherein the adjusting includes operating the actuator to move at least one of the adjustable shear ledge and the adjustable shroud based on the determining,
   wherein the discharge device is disposed on a container and comprises a housing including the plurality of material conveying components, the housing being attached to a sidewall of the container,
   wherein the adjustable shear ledge is mounted to the container adjacent to the plurality of material conveying components,
   wherein the adjustable shroud includes a shroud top surface, and is mounted to the container adjacent to the plurality of material conveying components,
   wherein the adjustable shear ledge includes at least one longitudinal mounting member, the at least one longitudinal mounting member allowing the adjustable shear ledge to translate along a first axis to bring the shear top surface towards or away from the plurality of material conveying components,
   wherein the shroud top surface of the adjustable shroud is arcuate, and
   wherein the arcuate shear top surface of the adjustable shear ledge and the arcuate shroud top surface of the adjustable shroud are substantially concentric with a swing path of the plurality of material conveying components, and are substantially continuous with each other along the swing path of the plurality of material conveying components.

2. The method of claim 1, wherein the determining is performed using a sensor which measures a torque of the plurality of material conveying components.

3. The method of claim 1, wherein the adjustable shroud is automatically adjusted based on the determining.

4. The method of claim 1, wherein the determining is performed using a sensor which measures a gap distance between the plurality of material conveying components and the adjustable shroud.

5. The method of claim 4, wherein at least one of a mounting position of a drive shaft that supports the plurality of material conveying components and the gap distance between the plurality of material conveying components and the adjustable shroud is adjusted based on the determining.

6. The method of claim 5, wherein the at least one of the mounting position of the drive shaft that supports the plurality of material conveying components and the gap distance between the plurality of material conveying components and the adjustable shroud is automatically adjusted.

7. The method of claim 6, wherein the at least one of the mounting position of the drive shaft that supports the plurality of material conveying components and the gap distance between the plurality of material conveying components and the adjustable shroud is automatically adjusted using a hydraulic system including the actuator.

8. The method of claim 5, wherein the at least one of the mounting position of the drive shaft that supports the plurality of material conveying components and the gap distance between the plurality of material conveying components and the adjustable shroud is adjusted to maintain a substantially concentric swing path with the plurality of material conveying components.

9. The method of claim 1, wherein the adjustable shear ledge is automatically adjusted based on the determining.

10. The method of claim 1, wherein the determining is performed using a sensor which measures a gap distance between the plurality of material conveying components and at least one of the adjustable shear ledge and the adjustable shroud.

11. The method of claim 10, wherein at least one of a mounting position of a drive shaft that supports the plurality of material conveying components and the gap distance between the plurality of material conveying components and at least one of the adjustable shear ledge and the adjustable shroud is adjusted based on the determining.

12. The method of claim 11, wherein the at least one of the mounting position of the drive shaft that supports the plurality of material conveying components and the gap distance between the plurality of material conveying components and at least one of the adjustable shear ledge and the adjustable shroud is automatically adjusted.

13. The method of claim 12, wherein the at least one of the mounting position of the drive shaft that supports the plurality of material conveying components and the gap distance between the plurality of material conveying components and at least one of the adjustable shear ledge and the adjustable shroud is automatically adjusted using a hydraulic system including the actuator.

14. The method of claim 11, wherein the at least one of the mounting position of the drive shaft that supports the plurality of material conveying components and the gap distance between the plurality of material conveying components and at least one of the adjustable shear ledge and the adjustable shroud is adjusted to maintain a substantially concentric swing path with the plurality of material conveying components.

15. The method according to claim 1, wherein the actuator of the discharge device includes a first actuator which moves the adjustable shear ledge, and a second actuator which moves the adjustable shroud, and
   wherein the adjusting includes operating the first actuator and the second actuator to adjust the adjustable shear ledge and the adjustable shroud based on the determining.

* * * * *